US012011038B2

(12) United States Patent
Scatterday

(10) Patent No.: US 12,011,038 B2
(45) **Date of Patent: *Jun. 18, 2024**

(54) ELECTRONIC VAPORIZER

(71) Applicant: Jupiter Research, LLC, Scottsdale, AZ (US)

(72) Inventor: Mark Scatterday, Scottsdale, AZ (US)

(73) Assignee: Jupiter Research, LLC, Phoenix, AZ (US)

( * ) Notice: Subject to any disclaimer, the term of this patent is extended or adjusted under 35 U.S.C. 154(b) by 474 days.

This patent is subject to a terminal disclaimer.

(21) Appl. No.: 17/359,863

(22) Filed: Jun. 28, 2021

(65) Prior Publication Data

US 2021/0321669 A1 Oct. 21, 2021

Related U.S. Application Data

(60) Continuation of application No. 16/986,829, filed on Aug. 6, 2020, now Pat. No. 11,044,943, which is a
(Continued)

(51) Int. Cl.
*A24F 40/42* (2020.01)
*A24F 40/40* (2020.01)
(Continued)

(52) U.S. Cl.
CPC ............. *A24F 40/42* (2020.01); *A24F 40/40* (2020.01); *A24F 40/50* (2020.01); *A24F 40/53* (2020.01);
(Continued)

(58) Field of Classification Search
None
See application file for complete search history.

(56) References Cited

U.S. PATENT DOCUMENTS 5,270,675 A * 12/1993 Mori ........................ H01F 1/09 335/297
D453,854 S 2/2002 Verhoeven-Koster
(Continued)

OTHER PUBLICATIONS 7.16 Magnetic Materials—Physics Libre Texts libretexts.org https://phys.libretexts.org> 07:_Magnetostatics>7.16:_. Nov. 17, 2022. (Year: 2022).*

*Primary Examiner* — James Harvey
(74) *Attorney, Agent, or Firm* — Schmeiser, Olsen & Watts LLP

(57) ABSTRACT

An electronic vaporizer device with a sealed, disposable, fillable cartridge is described, along with a method for refilling the cartridge. The electronic vaporizer includes a body which is held by the user and houses a battery. The body receives and couples with a cartridge with a reservoir for oil or other fluid to be vaporized. The cartridge also includes an atomizer which is powered by the battery via a connector terminal, a wick to provide oil to the atomizer from the oil reservoir, a vapor tube which transmits the vaporized oil to the user though a mouthpiece. In some embodiments, the user fills the reservoir of the cartridge by inserting a needle through a self-sealing septum. Further, the electronic vaporizer device includes a haptic device to provide haptic feedback to a user of the electronic vaporizer to communicate operating states of the electronic vaporizer.

10 Claims, 4 Drawing Sheets

Related U.S. Application Data continuation of application No. 16/513,451, filed on Jul. 16, 2019, now Pat. No. 10,750,788, which is a division of application No. 15/591,961, filed on May 10, 2017, now Pat. No. 10,398,178, which is a continuation-in-part of application No. 29/544,857, filed on Nov. 6, 2015, now Pat. No. Des. 800,310.

(60) Provisional application No. 62/334,124, filed on May 10, 2016.

(51) Int. Cl.

*A24F 40/50* (2020.01)
*A24F 40/53* (2020.01)
*H01R 13/62* (2006.01)
*A24F 15/015* (2020.01)
*A24F 40/10* (2020.01)

(52) U.S. Cl.

CPC ........ *H01R 13/6205* (2013.01); *A24F 15/015* (2020.01); *A24F 40/10* (2020.01)

(56) References Cited

U.S. PATENT DOCUMENTS

| | | | | |
|---|---|---|---|---|
| D493,911 | S | 8/2004 | Somma et al. | |
| D590,988 | S | 4/2009 | Hon | |
| D590,989 | S | 4/2009 | Hon | |
| D653,802 | S | 2/2012 | Kaljura | |
| D654,950 | S | 2/2012 | Ryan | |
| D667,878 | S | 9/2012 | Xie | |
| D687,181 | S | 7/2013 | Goch | |
| D692,612 | S | 10/2013 | Lowenthal et al. | |
| D696,455 | S | 12/2013 | Abroff | |
| D696,815 | S | 12/2013 | Abroff | |
| D699,391 | S | 2/2014 | Abroff et al. | |
| 8,820,330 | B2 | 9/2014 | Bellinger et al. | |
| 8,897,628 | B2 | 11/2014 | Conley et al. | |
| D724,781 | S | 3/2015 | Hearn et al. | |
| D725,310 | S | 3/2015 | Eksouzian | |
| D725,821 | S | 3/2015 | Levin et al. | |
| D736,460 | S | 8/2015 | Mckeon et al. | |
| D736,994 | S | 8/2015 | Mittersinker et al. | |
| D737,419 | S | 8/2015 | Emarlou | |
| D743,539 | S | 11/2015 | Chung et al. | |
| D750,320 | S | 2/2016 | Verleur et al. | |
| D750,834 | S | 3/2016 | Wei | |
| D750,835 | S | 3/2016 | Wei | |
| D752,278 | S | 3/2016 | Verleur et al. | |
| D753,872 | S | 4/2016 | Mittersinker et al. | |
| D754,389 | S | 4/2016 | Mittersinker et al. | |
| D754,390 | S | 4/2016 | Mittersinker et al. | |
| D758,650 | S | 6/2016 | Wu | |
| D758,651 | S | 6/2016 | Wu | |
| D776,338 | S | 1/2017 | Lomeli | |
| D776,869 | S | 1/2017 | Heidl | |
| D778,494 | S | 2/2017 | Scott et al. | |
| D800,310 | S | 10/2017 | Scatterday | |
| D801,581 | S | 10/2017 | Scott et al. | |
| D818,636 | S | 5/2018 | Qiu | |
| D823,536 | S | 7/2018 | Lai | |
| D825,834 | S | 8/2018 | Chen | |
| D829,373 | S | 9/2018 | Huang | |
| 10,111,470 | B2 * | 10/2018 | Monsees | H05B 1/0244 |
| D851,328 | S | 6/2019 | Smith | |
| D853,633 | S | 7/2019 | Zeng | |
| D864,474 | S | 10/2019 | Smith | |
| 10,653,180 | B2 | 5/2020 | Monsees et al. | |
| 2014/0261494 | A1 | 9/2014 | Scatterday | |
| 2014/0363145 | A1 | 12/2014 | Plojoux et al. | |
| 2014/0366899 | A1 | 12/2014 | Plojoux et al. | |
| 2014/0366900 | A1 | 12/2014 | Plojoux et al. | |
| 2015/0020831 | A1 | 1/2015 | Weigensberg et al. | |
| 2015/0328415 | A1 | 11/2015 | Minskoff et al. | |
| 2016/0057811 | A1 | 2/2016 | Alarcon et al. | |
| 2016/0174611 | A1 | 6/2016 | Monsees et al. | |
| 2016/0286860 | A1 | 10/2016 | Flayler | |
| 2016/0309788 | A1 | 10/2016 | Hawes et al. | |
| 2016/0338407 | A1 | 11/2016 | Kerdemelidis | |
| 2017/0006917 | A1 | 1/2017 | Alvarez | |
| 2017/0065001 | A1 | 3/2017 | Li et al. | |
| 2017/0119052 | A1 | 5/2017 | Williams et al. | |
| 2017/0202265 | A1 | 7/2017 | Hawes et al. | |
| 2017/0238617 | A1 | 8/2017 | Scatterday | |
| 2018/0153220 | A1 | 6/2018 | Verleur et al. | |
| 2018/0289907 | A1 | 10/2018 | Marmur et al. | |
| 2018/0352870 | A1 | 12/2018 | Qiu | |
| 2019/0263653 | A1 | 8/2019 | Scatterday | |
| 2019/0335815 | A1 | 11/2019 | Scatterday | |
| 2021/0052014 | A1 * | 2/2021 | Hejazi | A61M 11/04 |
| 2021/0321669 | A1 * | 10/2021 | Scatterday | A24F 40/40 |

* cited by examiner

ELECTRONIC VAPORIZER

CROSS REFERENCE TO RELATED APPLICATION[S]

This application is a Continuation of U.S. Patent Applications entitled "ELECTRONIC VAPORIZER," Ser. No. 16/986,829, filed on Aug. 6, 2020, which is a continuation of U.S. Patent Applications entitled "electronic VAPORIZER," Ser. No. 16/513,451, filed on Jul. 16, 2019, which is a divisional of the earlier U.S. Utility Patent Applications entitled "electronic vaporizer," Ser. No. 15/591,961, filed May 10, 2017, which is a continuation-in-part of the earlier U.S. Utility Patent Applications entitled "electronic vaporizer," Ser. No. 29/544,857, filed Nov. 6, 2015, and Claims Priority to U.S. Provisional Patent Applications entitled "electronic vaporizer," Ser. No. 62/334,124, filed May 10, 2016, the disclosures of which are hereby incorporated entirely herein by reference.

BACKGROUND OF THE INVENTION

Technical Field

This invention relates to an electronic vaporizer. In particular, the invention relates to an electronic vaporizer device with a disposable, fillable cartridge.

State of the Art

The use of *cannabis* is increasing throughout the states as various state laws make it legal to use *cannabis*, either recreationally or for medical purposes. One form of using *cannabis* is through smoking. Those that use, particularly those that are using for medical purposes may like the form of smoking the *cannabis* but dislike what it visually displays to others around them and they may dislike the smell that is a byproduct of burning the *cannabis*. Smoking is also not a convenient form of medicating or dispensing the *cannabis*.

Accordingly, what is needed is an electronic vaporizer with a sealed cartridge that can be filled without opening the cartridge and wherein the cartridge can easily separate from the body of the electronic vaporizer for cleaning of any accumulated residue.

DISCLOSURE OF THE INVENTION

The present invention relates to an electronic vaporizer device with a sealed, disposable, fillable cartridge. Additionally, some embodiments include haptic feedback.

An embodiment includes an electronic vaporizer comprising: a body portion with a power source operatively coupled within, the body including a recess; and a disposable, fillable cartridge comprising a reservoir, a self-sealing membrane and an atomizer, wherein: the self-sealing membrane (such as a septum) is penetrated for filling and seals after removing a port for filling the reservoir to retain fluid within the reservoir; and the atomizer operates to create vaporized fluid from the fluid within the reservoir.

Another embodiment includes a fillable cartridge for use with an electronic vaporizer, the cartridge comprising: a reservoir; an atomizer; and a magnetically attractive material coupled on an end of the cartridge, wherein: the magnetically attractive material is configured to magnetically couple to a magnet of the electronic vaporizer; and the atomizer operates to create vaporized fluid from the fluid within the reservoir.

Further, another embodiment includes an electronic vaporizer comprising: a body portion with a haptic device operatively coupled within, the body including a recess; and a cartridge comprising a reservoir filled with fluid and an atomizer operating to create vaporized fluid from the fluid within the reservoir, wherein the haptic device operates to provide haptic feedback to a user indicating a status of the electronic vaporizer during activation of the electronic vaporizer, after activation of the electronic vaporizer, or during and after activation of the electronic vaporizer.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, the disclosed invention relates to an electronic vaporizer device with a sealed, disposable, Tillable cartridge. Additionally, some embodiments include haptic feedback.

The electronic vaporizer includes a body which is held by the user and houses a battery, an IC chip, a negative pressure sensor and other components for operation of the electronic vaporizer. The body receives and is removably coupled to a cartridge with a reservoir for fluid to be vaporized. The cartridge also comprises an atomizer which is powered by the battery via a connector terminal, a delivery mechanism to provide fluid to the atomizer from the fluid reservoir, a vapor tube which transmits the vaporized fluid to the user though a mouthpiece. In some embodiments, the user fills the reservoir of the cartridge by inserting a port, such as, but not limited to a needle, through a self-sealing membrane.

Figure 1:
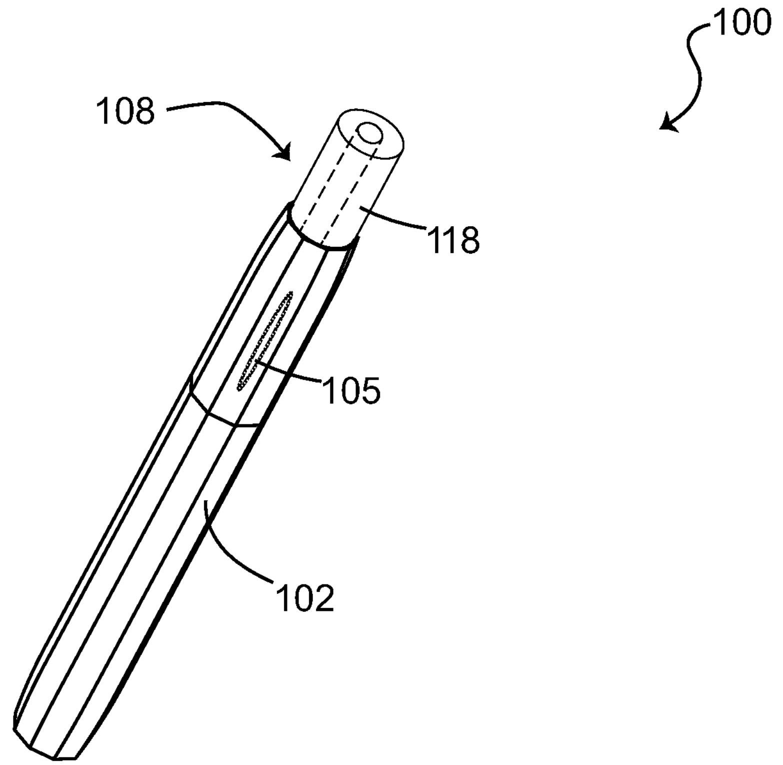
FIG. 1 is perspective view of an electronic vaporizer, according to an embodiment.

FIG. 1 is a perspective view of an electronic vaporizer. FIG. 1 shows electronic vaporizer 100 having a body 102 containing a power source 103 (such as, but not limited to a battery) and receiving a cartridge 108.

Body 102 couples the various elements of electronic vaporizer 100 together into an assembled unit and is the portion held by a user of the device. Accordingly, the shape of body 102 is variable according to different applications and user preferences. Body 102, as shown in FIG. 1, is generally elongate in some embodiments. An elongate shape emulates the shape of a cigarette or cigar. In some embodiments, body 102 is a circular or an ovoid cylinder. In some embodiments, such as the example embodiment shown in FIG. 1, body 102 is a polygonal cylinder, such as, but not limited to, a nonagonal cylinder, an octagonal cylinder, a hexagonal cylinder and any other rectilinear shape. These example shapes are in no way meant to be limiting; body 102 may be shaped in any form desired by the manufacturer for the end-user of electronic vaporizer 100. Body 102 is not necessarily an elongate shape. Body 102 may have a bulbous shape or be shaped like various other objects, such as traditional tobacco pipes and water pipes. Different shapes of body 102 provide functionality according to the preference of a user of electronic vaporizer 100, in that body 102 is the portion of electronic vaporizer the user grips and it is anticipated that different shapes will appeal to different user preferences. In some embodiments, body 102 further comprises a viewport 105, wherein a user of electronic vaporizer 100 may observe the level of remaining vape fluid charging cartridge 108 (discussed in detail herein below). Body 102 is made from any suitable material, some non-limiting examples including aluminum, stainless steel, other metal or metals alloys; plastic, carbon fiber, other synthetic materials; wood; and other suitable materials.

Figure 2:
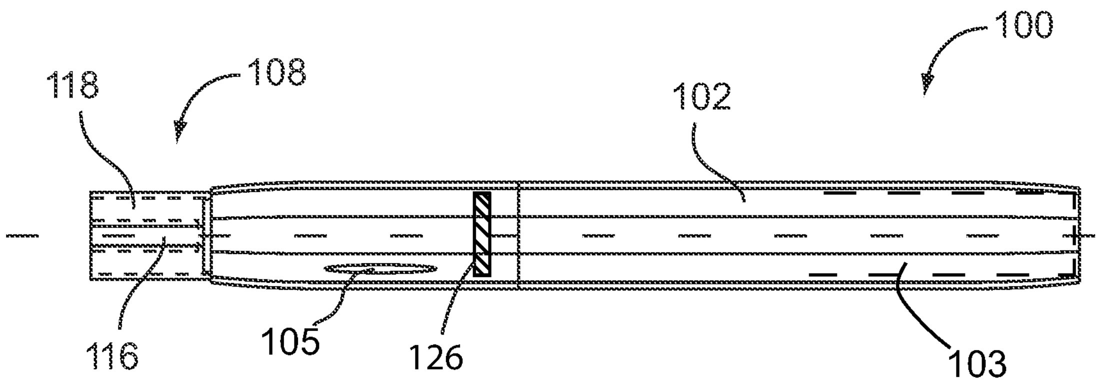
FIG. 2 is a side view of an electronic vaporizer, according to an embodiment.

FIG. 2 is a side view of an electronic vaporizer. As shown in FIG. 2, body 102 encases battery 103. In some embodiments, battery 103 is removably coupled to body 102 wherein a non-functional battery 103 may be removed from body 102 and replaced with a new, functional battery 103. In some embodiments, battery 103 is fixedly coupled to body 102 and non-rechargeable, wherein body 102 and battery 103 are discarded together as a unit following discharge of battery 103. In some embodiments, battery 103 is a rechargeable battery, such as a lithium-ion battery. In some embodiments, battery 103 is any suitable battery, chargeable or non-rechargeable. Battery 103 provides power to generate vapor from a vape fluid 104 contained within a reservoir 110 of cartridge 108.

FIG. 2 additionally shows a magnet 126 coupled to battery 103. In some embodiments, magnet 126 attracts a ferrous surface on cartridge 108, discussed further herein below. In some embodiments wherein battery cartridge is removably coupled to body 108, magnet 126 provides a means wherein cartridge 108 is secured in contact with battery 103 within body 102, yet easily removed from body 102 when desired by a user of electronic vaporizer 100. Battery 103 is discussed further herein below (see discussion of FIG. 6).

Figure 8:
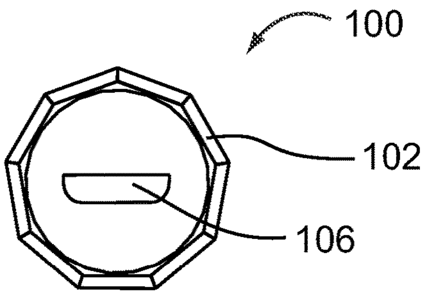
FIG. 8 is a bottom view of an electronic vaporizer, according to an embodiment.

In some embodiments, body 102 further comprises a charging port (not shown), wherein battery 103 is electrically coupled to charging port 106 and receives a charging current when an external power source is removeably coupled to charging port 106 (See FIG. 8).

Figure 3:
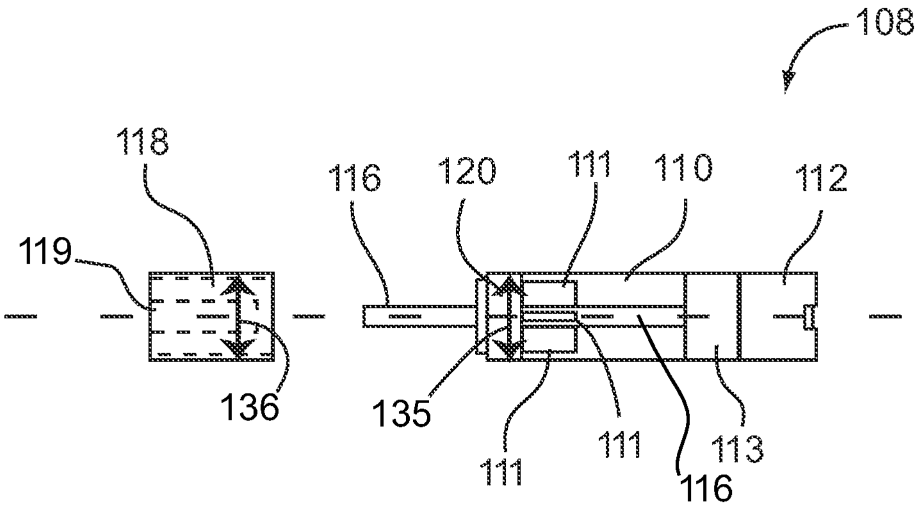
FIG. 3 is a partially exploded side view of a cartridge for an electronic vaporizer, according to an embodiment.
Figure 4:
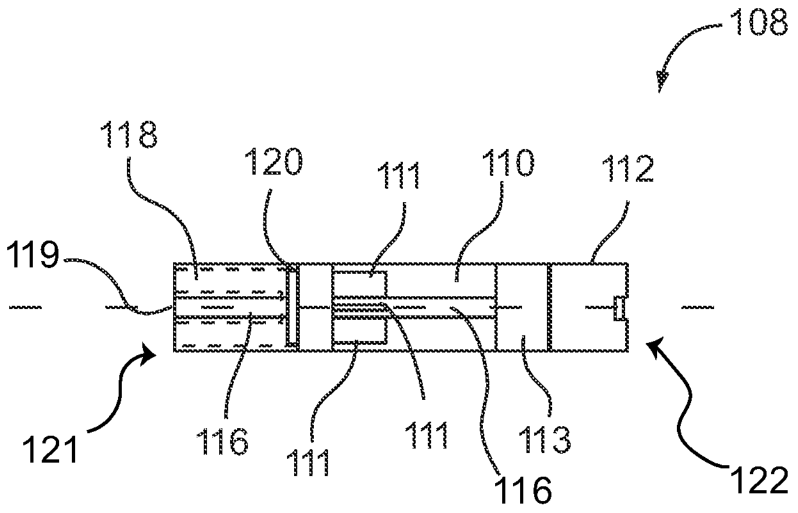
FIG. 4 is a side view of a cartridge for an electronic vaporizer, according to an embodiment.

FIG. 3 is a partially exploded side view of cartridge 108. FIG. 4 is a side view of cartridge 108. As shown in FIG. 3 and FIG. 4, cartridge 108 comprises a reservoir 110, an atomizer 112, a wick 113, and a vapor tube 116, in some embodiments. Additionally, FIG. 4 shows a first end 121 and a second end 122 of cartridge 108. Body 102 receives cartridge 108 and removably couples to cartridge 108, in some embodiments. In the embodiment shown in the figures, cartridge 108 is shaped as an elongate cylinder with a diameter to be received by body 102. This is not meant to be limiting; cartridge 108 may take other shapes and forms, limited by the size and shape of receiving body 102 as described herein above. In some embodiments, cartridge 108 comprises a first diameter and a second diameter. In some embodiments, the first diameter and the second diameter are the same measurement wherein battery 103 within body 102 prevents second diameter 136 of cartridge 108 from passing completely into body 102. In some embodiments, the second diameter is slightly larger than the first diameter, forming a step at which point first diameter changes to second diameter and preventing second diameter from passing completely into body 102, being prevented in doing so by the step. In some embodiments, the second diameter matches the diameter 137 of body 102 such that the outer surface of body 102 and that portion of the outer surface of cartridge 108 not contained within body 102 present a continuous surface when body 103 is coupled to cartridge 108. The first diameter comprises reservoir 110, described in detail herein below, and is entirely received and encircled by body 102. The second diameter comprises a mouthpiece 118 encircling vapor tube 116 terminating at a mouthpiece hole 119. Mouthpiece 118 is not received in body 102; rather, the second diameter protrudes and extends from body 102. In some embodiments, first diameter 135 is a smaller measurement than second diameter 136, such that body 102 receives first diameter 135 but does not receive the larger second diameter 136.

In some embodiments, cartridge 108 further comprises a first coupling means wherein cartridge 108 and body 102 are removably coupled to one another. In some embodiments, the first coupling means comprises corresponding threads on cartridge 108 and body 102. In some embodiments, the first coupling means comprises a ridge on either cartridge 108 or body 102 with a corresponding feature on the other element which removably engages the ridge. In some embodiments, first coupling means is a magnet on atomizer 112 which attractively interacts with a corresponding ferrous surface on battery 103.

Reservoir 110, as shown in FIG. 3 and FIG. 4, contains the vape fluid to be delivered to the user of electronic vaporizer 100 as a vapor. In some embodiments, reservoir 110 is fillable and is not refillable, as discussed herein; however, in some embodiments, reservoir 110 is refillable. In some example embodiments, reservoir 110 is formed from a clear plastic; polycarbonate plastic, for example, wherein the user may observe the amount of the vape fluid remaining in reservoir 110. In some embodiments, for example, the user observes the amount of the vape fluid remaining in a transparent or translucent reservoir 110 via viewport 105 (as shown in FIG. 1 and FIG. 2) without the need to remove cartridge 103 from body 102. The use of a transparent material, such as polycarbonate, to form reservoir is not meant to be limiting; other suitable materials may be used to form reservoir 110 such as opaque plastic, metals, metal alloys, and the like. Reservoir 110, in some embodiments, is an elongate hollow cylinder, sealed at one end with a self-sealing membrane 120 and at the other end with an atomizer 112. In some embodiments, reservoir 110 further comprises a fin 111. Fin 111 functions to couple self-sealing membrane 120 to reservoir 110, and to stabilize and buttress self-sealing membrane 120. In some embodiments, such as the embodiments shown in the figures, cartridge 108 comprises a plurality of fins 111.

Atomizer 112, as shown in FIG. 3 and FIG. 4, converts the vape fluid contained in reservoir 110 to a vapor to be consumed by the user of electronic vaporizer 100. In some embodiments, atomizer 112 comprises a heating element, such as a wire or coil, electrically coupled to a connector 114

(shown in FIG. 6), wherein battery 103 is electrically coupled to atomizer 112 of cartridge 108 via connector 114. Battery 103 energizes the heating coil causing the vape fluid in contact with a vaporizing element (not shown) of atomizer 112 to vaporize. In some embodiments atomizer 112 comprises other acceptable means known in the art to vaporize the vape fluid. In some embodiments, wick 113 causes the vape fluid to pass from reservoir 110 to atomizer 112 by capillary action. This is not meant to be limiting. In some embodiments, other means of delivering vape fluid 104 from reservoir 110 to atomizer 112 are employed by electronic vaporizer 100, such as a ceramic atomizer that performs the function of the wick 113 without the need for a wick.

In some embodiments, atomizer 102 further comprises a sensor (not shown). In some embodiments where present, the sensor activates the vaporizing element of atomizer 112 in response to a stimulus from the user of electronic vaporizer 100, such as sucking on mouthpiece 118. In some embodiments, the sensor is a vacuum-activated switch. In some embodiments, the sensor is located on an outer surface of body 102 and activated by direct finger pressure by the user, wherein the user activates a switch to energize the vaporizing element of atomizer 112.

After atomizer 112 vaporizes the vape fluid from reservoir 110 of cartridge 108, the vapor passes through a vapor tube 116 to mouthpiece 118 comprising a mouthpiece hole 119 through which vapor exits electronic vaporizer 100. Vapor tube 116, in some embodiments, passes axially through reservoir 110 and is formed as a unitary body with reservoir 110. The lumen of vapor tube 116 is not in communication, however, with reservoir 110, therefore vape fluid 104 contained within reservoir 110 does not contact vapor passing through vapor tube 116. Vapor tube 116 transmits the vapor created by atomizer 112 to mouthpiece 118. A user of electronic vaporizer 100 draws the vapor from vapor tube 116 through mouthpiece 118.

Figure 5:
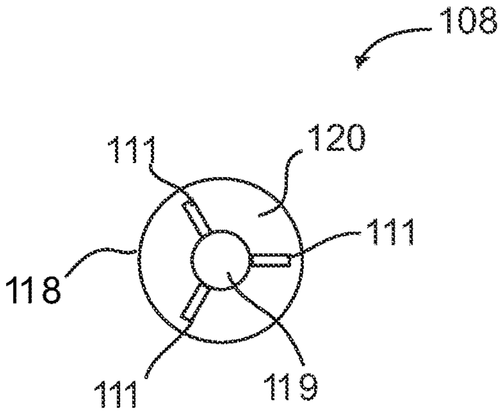
FIG. 5 is a first end view of a cartridge for an electronic vaporizer, according to an embodiment.

FIG. 5 is a first end view of a cartridge for an electronic vaporizer. FIG. 5 shows the end-view at first end 121 (shown in FIG. 4). As shown in FIG. 5 and FIG. 4, vapor tube terminates at a mouthpiece hole 119 within mouthpiece 118. In some embodiments wherein mouthpiece 118 is removably coupled to cartridge 108, such as the embodiment shown in FIG. 3, vapor tube 116 passes through mouthpiece 118, from self-sealing membrane 120 through a mouthpiece hole 119. In some embodiments wherein mouthpiece 118 is not removably coupled to cartridge 108, mouthpiece 108 and reservoir 110 comprise a contiguous unitary body through which passes vapor tube 116.

FIG. 5 also shows self-sealing membrane 120, as seen through mouthpiece 118 and supported by three fins 111 located within reservoir 110 (not shown in FIG. 5). As mentioned herein above, in some embodiments reservoir 110 is fillable, wherein self-sealing membrane 120 seals reservoir 110. As shown in FIG. 3, FIG. 4, and FIG. 5, self-sealing membrane 120 is molded onto said end such that self-sealing membrane 120 functions as a “cap” to cover and seal reservoir 110 of cartridge 108. Self-sealing membrane 120, in some embodiments, is a membrane formed from an elastomeric material. This is not meant to be limiting; self-sealing membrane 120 may be formed by other self-sealing materials, such as natural or synthetic rubber, such as, but not limited to silicone, and the like. Self-sealing membrane 120 allows the reservoir 110 of the electronic vaporizer 100 without opening cartridge 108 wherein the risk of spilling the vape fluid, contaminating the outside surfaces of cartridge 108 with vape fluid, or inadvertently contacting the skin of a person with the vape fluid are minimized. In embodiments wherein cartridge 108 comprises self-sealing membrane 120, and some other embodiments, mouthpiece 118 is attachable to cartridge 108 and locks to cartridge 108 to cover self-sealing membrane 120 after filling reservoir 110 in order to prevent adding foreign fluid into the reservoir 110 or removing vape fluid from the reservoir 110 or otherwise contaminating or lacing the vape fluid with other ingredients or chemicals or the like.

In embodiments, self-sealing membrane 120 of cartridge 108 further provides a seal between cartridge 108 and body 102. As cartridge 108 is coupled within body 102, self-sealing membrane 120 engages an inner surface of body 102 to seal an inner volume of body 102 that receives cartridge 108. The seal prevents saliva, other fluids and foreign particles from entering between cartridge 108 and body 102 so that the saliva, other fluids and foreign particles do not inhibit proper function of the vaporizer.

To fill reservoir 100, vape fluid may be loaded into a syringe. The vape fluid may be supplied in a multi-dose container, such as a vial or other suitable container, capped with a similar self-sealing membrane, such as a standard multi-dose vial manufactured for dispensing liquid injectable pharmaceuticals. Use of vape fluid from such a container further reduces the risk of spillage and skin contact. The person filling the syringe then punctures self-sealing membrane 120 with a port, such as a needle of the loaded syringe, passing the needle into reservoir 110. The person then injects the vape fluid from the syringe through the needle into reservoir 110. Air contained within reservoir 110 is displaced by the vape fluid as reservoir 10 is filled, passing through wick 113, atomizer 112 and out through vapor tube 116. Alternatively stated, as reservoir 110 is filled, a pressure difference between the interior of reservoir 110 and ambient pressure equalizes through vapor tube 116 via atomizer 112. Thus, as reservoir 110 is being filled, air within chamber 110 is displaced by the vape fluid, allowing for reservoir 110 to be completely filled with the vape fluid. After filling of reservoir 110 has been completed, self-sealing membrane 120 self-seals as the needle is withdrawn by the user.

Accordingly, in embodiments, mouthpiece 118 comprises an attachment means (not shown) wherein mouthpiece 118 is fixedly or securely attached to cartridge 108. Thus, mouthpiece 108 may not be removed to refill reservoir 110, or to replace an old mouthpiece 108 which may be discolored, dirty, cracked, etc., with a new mouthpiece 108. In some embodiments, such as the example embodiment shown in FIG. 3, the attachment means couples mouthpiece 118 to that portion of vapor tube 116 extending from reservoir 110. Some non-limiting examples of attachment means include a deformable ridge or collar on which engages a corresponding feature on cartridge 108 in order to secure the mouthpiece 118 to the cartridge 108.

Accordingly, in embodiments, mouthpiece 118 comprises an attachment means (not shown) wherein mouthpiece 118 is removable attached to cartridge 108. Thus, mouthpiece 108 may be removed to refill reservoir 110, or to replace an old mouthpiece 108 which may be discolored, dirty, cracked, etc., with a new mouthpiece 118. Additionally, mouthpiece 118 functions as a removable “cap,” covering and protecting self-sealing membrane 120. In some embodiments, such as the example embodiment shown in FIG. 3, the attachment means couples mouthpiece 118 to that portion of vapor tube 116 extending from reservoir 110. Some non-limiting examples of attachment means include a deformable ridge or collar on which releasably engages a corresponding feature on cartridge 108, corresponding threads on mouthpiece 118 and cartridge 108, and the like.

Figure 6:
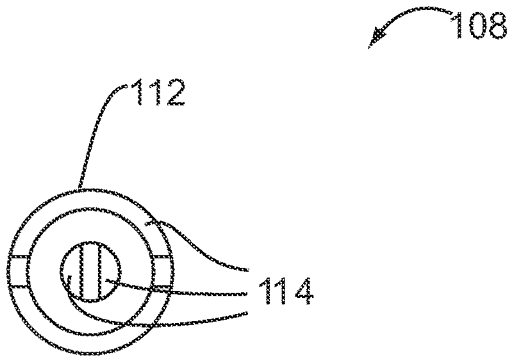
FIG. 6 is a second end view of a cartridge for an electronic vaporizer, according to an embodiment.

FIG. 6 is a second end view of a cartridge for an electronic vaporizer. FIG. 6 shows the end-view at second end 122 (shown in FIG. 4). In some embodiments, cartridge 108 further comprises a ferrous surface (not shown), or other magnetically attractable material, attached coupled to second end 122 of cartridge 108 proximate to connector 114, wherein magnet 126 on battery 103 (see FIG. 2) causes cartridge 108 to be removably coupled to battery 103. FIG. 6 shows sub-elements of connector 114, present in some embodiments. Connector 114 is discussed herein above. As discussed herein above, magnet 126 provides a means to secure cartridge 108 within body 100 proximate to battery 103 wherein battery is electrically coupled to atomizer 112. Although magnet 126 provides a secure coupling between atomizer 112 of cartridge 108 and battery 103 of body 102, the coupling is readily broken with an applied force on mouthpiece 118 of cartridge 108 axially away from the body 102, allowing for fast removal and replacement of cartridge 108 when desired by a user of electronic vaporizer 100, such as when the user wishes to use a cartridge containing a different vape fluid, for cleaning residue from cartridge 108 and body 102, or if the user desires to see the remaining fluid in an embodiment without a window 105.

Figure 7:
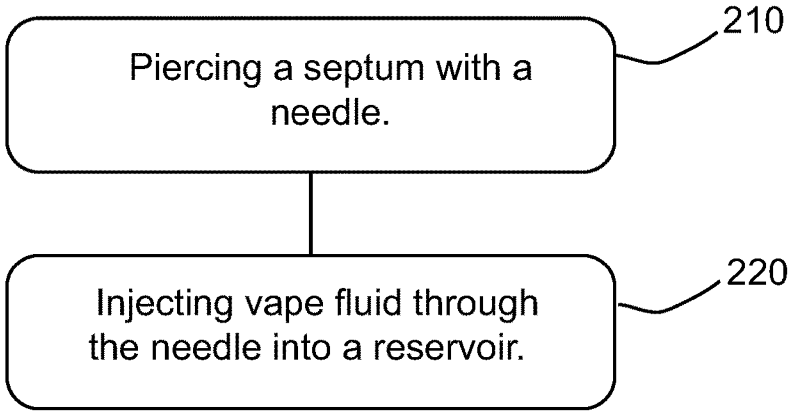
FIG. 7 is a flow chart of a method of using an electronic vaporizer, according to an embodiment.

FIG. 7 is a diagram of a method of filling an electronic vaporizer. Method 200 comprises a piercing step 210 and an injecting step 220. Piercing step 210 comprises piercing a self-sealing membrane with a needle. Injecting step 220 comprises injecting vape fluid through the needle into a reservoir. In some embodiments, the needle is connected to a syringe containing a vape fluid, wherein a user causes the syringe to inject vape fluid through the needle into the reservoir. During injecting step 220, air within the reservoir is displaced as injected vape fluid fills the reservoir such that pressure is equalized between the reservoir and ambient pressure. In some embodiments, the method 200 may further include withdrawing the port or needle from the self-sealing membrane, wherein the self-sealing membrane self-seals upon removal of the needle on completion of injecting step 220.

Figure 9:
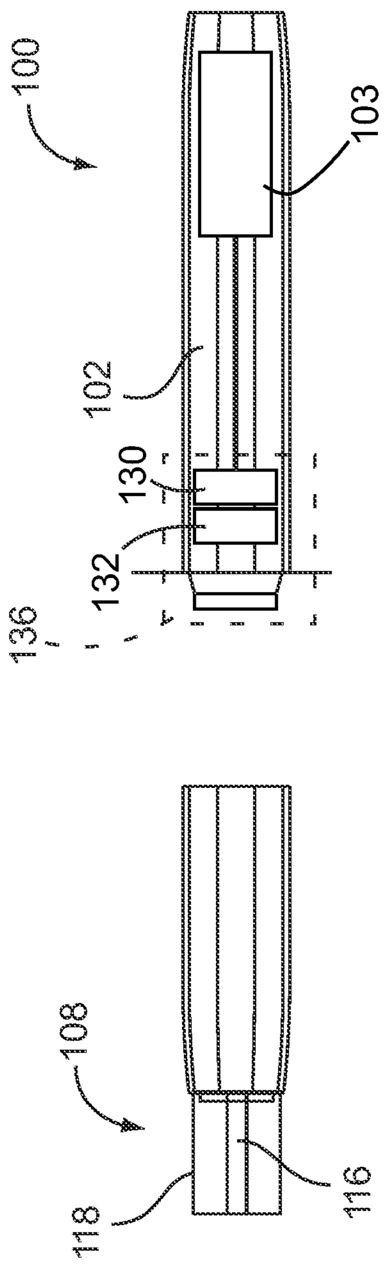
FIG. 9 is an exploded and partial section view of an electronic vaporizer, according to an embodiment.

FIG. 9 is a section view of an electronic vaporizer 100 with a haptic device 130, according to an embodiment. The location of the haptic device may be other than that shown in FIG. 9. Haptic feedback in the electronic vaporizer power supply is produced by a haptic device 130, such as but not limited to a vibration motor. The haptic device 130 may be, but is not limited to a "coin type" vibration motor or any device that converts electrical energy into mechanical energy that is intended to be tactilely sensed, or can be tactilely sensed by the user while the vaporizer is actively producing vapor may be used.

The electronic vaporizer 100 may further include an electronic controller 132 coupled to a power supply 103, the power supply 103 supplying electrical power to the haptic device 130 when the electronic vaporizer 100 is activated. The haptic device 130 runs and produces a vibration that can be felt by the user. Power is removed when the electronic vaporizer 100 is inactive. The power may be controlled at a constant voltage in order to maintain a consistent frequency over the battery's life.

In some embodiments, a voltage closer to that of a Li-ion battery were used, the power to the haptic device 130 may be reduced as the battery cell's 103 voltage decreases. Decreasing the voltage to the haptic device 130 will decrease the frequency of vibration. If a haptic device 130 with a large change in frequency for a small change in voltage is utilized, the electronic vaporizer 100 may change the vibration frequency to provide an alert to the user of an estimate remaining battery capacity based on the vibration frequency. Used in this way, haptic feedback can be used to provide a relative indication of remaining operation of the electronic vaporizer 100 based on the battery cell's 103 remaining charge. For example and without limitation, in an embodiment, the haptic device 130 runs when the device 100 is actively delivering power to the cartridge 108. When the remaining battery power at the start of the activation is between 5 and 20%, the haptic device 130 may provide a pulse, wherein the haptic device 130 stops for approximately 100 milliseconds at the end of the activation, then energizes for approximately 100 milliseconds providing the short pulse of vibration. When power is less than 5%, the haptic device 130 alter the pulse, such as but not limited to, may send two 100 millisecond pulses. These provide a signal to the user that remaining battery power is low.

Haptic feedback may be used to signal other events or conditions of the electronic vaporizer 100 to the user. If a cartridge 108 with a short circuit or other defect is installed, the electronic controller 132 may send five short pulses to the haptic device 130 instead of activating the device's 100 output, signaling to the user that there is a problem with the cartridge 108. Additionally, the haptic feedback may also be used to signal the duration of the activation by the electronic controller 132 providing a brief power stoppage at regular intervals. For example, power to the haptic device 130 is interrupted for approximately 50-100 milliseconds at 1 second intervals during activation of the electronic vaporizer 100. The user could count the interruptions to determine the length of activation and adjust to the desired dosage. In other words, the haptic feedback controlled by operation of the haptic device 130 by the electronic controller 132 may indicate a predetermined amount of time of activation of the electronic vaporizer 100, such as seconds. Dosage may be determined by how many second the electronic vaporizer 100 is activated. This allows the user to more accurately dose by providing an active haptic feedback of operation. Additionally, the haptic feedback may be controlled when a certain volume of fluid is dosed.

While it is disclosed that the haptic feedback for various statuses is controlled by supplying power to the haptic device 130 during activation of the electronic vaporizer 100 to continuously vibrate the electronic vaporizer 100 and provide pauses in the vibration to communicate the status of the electronic vaporizer, other forms of haptic feedback may be utilized. For example, and without limitation, the haptic device 130 may not operate during activation of the electronic vaporizer 100 and then vibrate or pulse in intervals to communicate the status of the electronic vaporizer 100.

The haptic device 130 may be mounted in a plastic sleeve (not shown) that fits inside of a power supply housing or body 102. The haptic device 130 may fit tightly inside an inner diameter of the plastic sleeve, and the plastic sleeve fits tightly in a base 136 of the body 102. The placement of the haptic device 130 may be perpendicular to the axis of the body 102. It could be mounted parallel to the axis, or at any angle, but mounting in this manner would increase the length of the device. The haptic device 130 may be located near the connection to the replaceable cartridge 108, but may be located at the distal end of the housing near the charging port 106.

The embodiments and examples set forth herein were presented in order to best explain the present invention and its practical application and to thereby enable those of ordinary skill in the art to make and use the invention.

However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An electronic vaporizer comprising:

a body portion with a haptic device operatively coupled within; and a cartridge coupled to the body portion, the cartridge comprising a reservoir filled with fluid and an atomizer operating to create vaporized fluid from the fluid within the reservoir, wherein the haptic device operates to provide haptic feedback to a user indicating a status of the electronic vaporizer during activation of the electronic vaporizer, after activation of the electronic vaporizer, or during and after activation of the electronic vaporizer, wherein the coupling between the cartridge and the body further connects electricity to the cartridge for operating the atomizer.

2. The electronic vaporizer of claim 1, wherein the haptic device provides haptic feedback to signal low battery power.

3. The electronic vaporizer of claim 1, wherein the haptic device provides haptic feedback to signal a defective cartridge is installed in the electronic vaporizer.

4. The electronic vaporizer of claim 1, wherein haptic device provides haptic feedback to signal a dosing amount.

5. The electronic vaporizer of claim 4, wherein the haptic feedback to signal the dosing amount operates to vibrate at predetermined time intervals, wherein the predetermined time intervals correspond to a dosing amount of vaporized fluid created by the atomizer.

6. A method of using an electronic vaporizer comprising:

coupling a body portion of the electronic vaporizer comprising a cartridge, the body portion having a haptic device coupled within and the cartridge comprising a reservoir filled with fluid and an atomizer, wherein the coupling between the cartridge and the body further connects electricity to the cartridge for operating the atomizer;

activating the electronic vaporizer to create vaporized fluid; and providing haptic feedback during activation of the electronic vaporizer, after activation of the electronic vaporizer, or during and after activation of the electronic vaporizer.

7. The method of claim 6, further comprising providing haptic feedback to signal low battery power.

8. The method of claim 6, further comprising providing haptic feedback to signal a defective cartridge is installed in the electronic vaporizer.

9. The method of claim 6, further comprising providing haptic feedback to signal a dosing amount.

10. The method of claim 9, wherein providing haptic feedback to signal the dosing amount comprises vibrating at predetermined time intervals, wherein the predetermined time intervals correspond to a dosing amount of vaporized fluid created by the atomizer.

* * * * *